May 30, 1967  L. F. BENDER  3,322,100
FLUID ACCUMULATOR FOR MILK LINE EQUIPMENT
Original Filed March 26, 1965  2 Sheets-Sheet 2
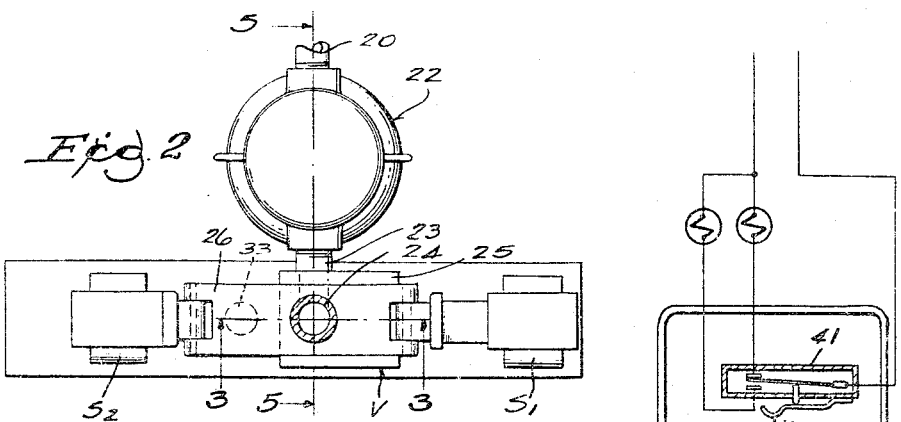
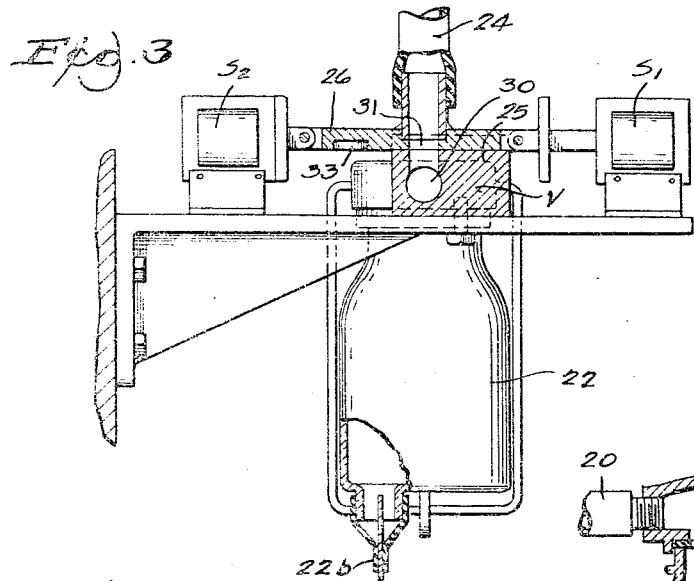
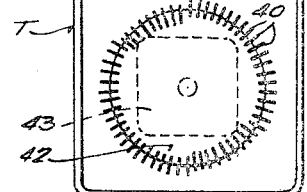
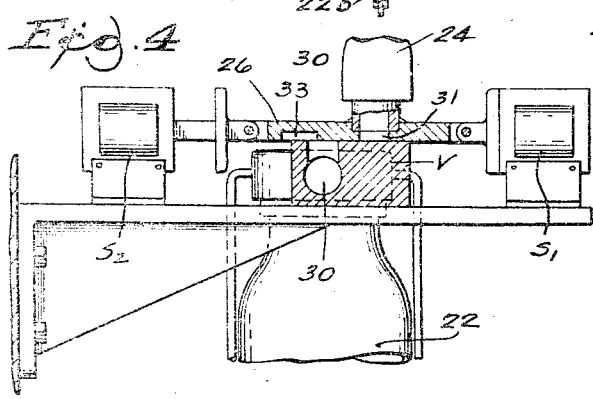
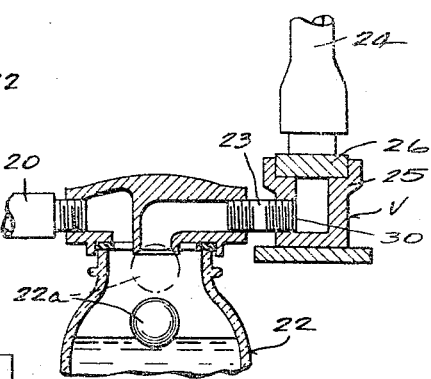
INVENTOR:
LLOYD F. BENDER
BY: James E. Nilles
ATTORNEY

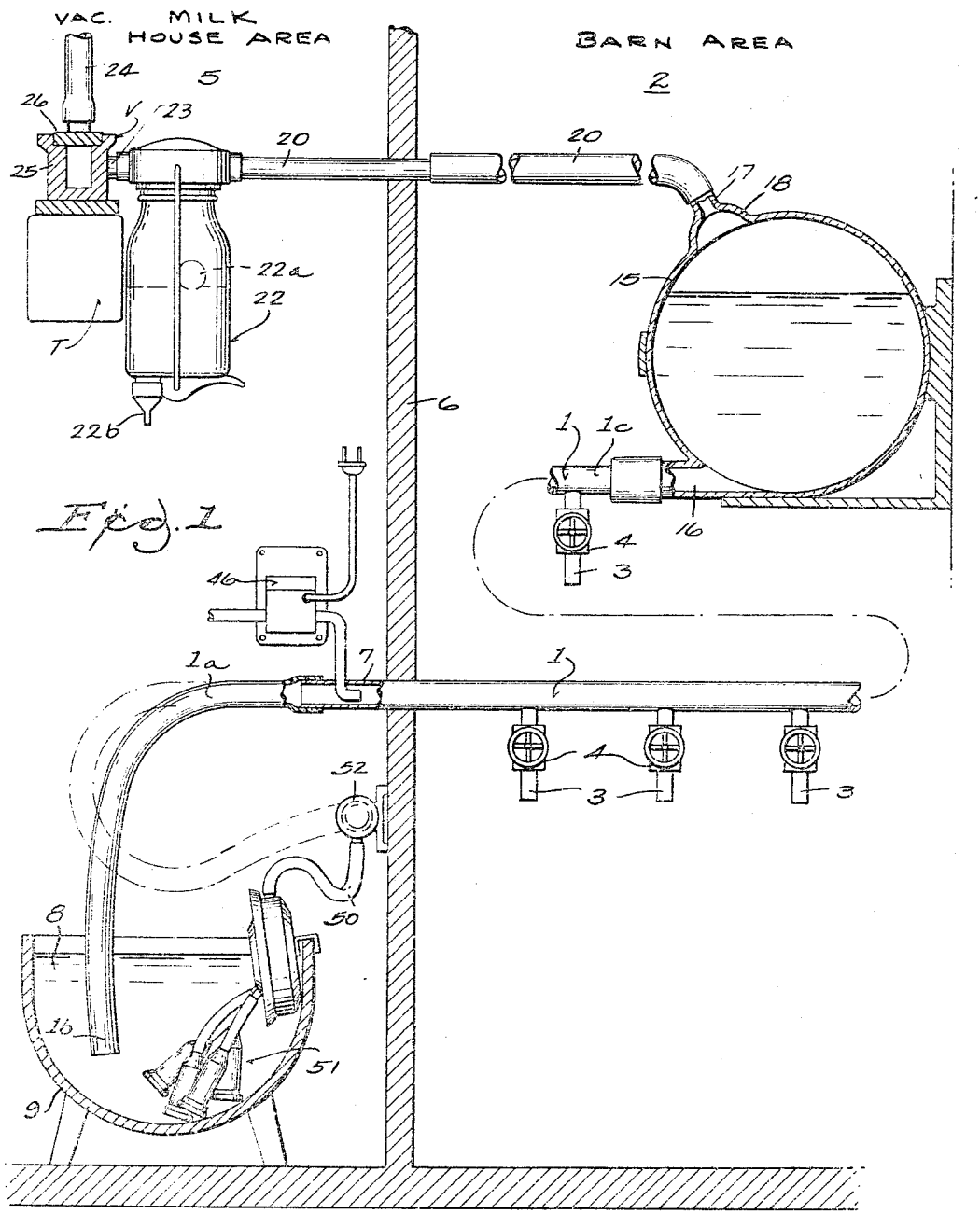

United States Patent Office 3,322,100
Patented May 30, 1967

3,322,100
FLUID ACCUMULATOR FOR MILK LINE
EQUIPMENT
Lloyd F. Bender, Hayward, Wis. 54843
Original application Mar. 26, 1965, Ser. No. 443,055.
Divided and this application June 13, 1966, Ser. No. 557,138
4 Claims. (Cl. 119—14.46)

The present invention is a divisional application of my co-pending U.S. Ser. No. 443,055, filed Mar. 26, 1965, entitled, "Milk Line Equipment," now issued as Patent No. 3,310,061, on Mar. 21, 1967.

This invention relates generally to diary equipment such as cleaning apparatus for milk lines and liquid pumping mechanism for transporting milk from one tank to another, and relates more specifically to a fluid accumulator for use with such equipment.

The said co-pending application relates to cleaning apparatus for a milk line system which eliminates contaminated air of the barn from the milk line; eliminates the necessity for a return milk line with the necessary additional hangers; provides in-place cleaning; eliminates all mechanical parts in the systetm which would otherwise require cleaning, and permits a more simple valve arrangement for regulating and timing the application of vacuum to the system.

The present invention relates to a fluid accumulator which is connected to an electrically operated valve means through which valve means the accumulator is alternately subjected to vacuum and then atmospheric pressure to create a fluid pumping action, and the accumulator can remain sealed against the entry of contaminated air.

An object of the present invention is to provide an improved accumulator which is completely and easily cleaned in place, and which has a novel vacuum inlet that minimizes fluid being drawn from the accumulator by the vacuum.

These and other objects and advantages will appear hereinafter as this disclosure progresses, reference being had to the accompanying drawings in which:

FIGURE 1 is a more or less schematic, elevational view of apparatus embodying the present invention, certain parts being shown in section or removed for clarity;

FIGURE 2 is a plan view of a portion of the device as shown in FIGURE 1, but on an enlarged scale;

FIGURE 3 is an elevational view of the FIGURE 2 device, but showing a part of its cross section, the cross-sectional view taken along line 3—3;

FIGURE 4 is a fragmentary view similar to FIGURE 3, but showing the valve moved to the atmospheric pressure position;

FIGURE 5 is a cross-sectional view taken along line 4—4 in FIGURE 2 and

FIGURE 6 is an enlarged view of the timer shown in FIGURE 1, certain parts being shown in section.

The apparatus as shown in FIGURE 1 is set up for cleaning a milk line 1 which may extend for a considerable length in the barn area 2, and which has a series of milk inlet conduits 3 to which are attached the various milking machines (not shown) throughout the barn. A valve 4 is provided for each milk inlet conduit and the conduits 3 are closed when the apparatus is being cleaned.

A milk house area 5 is located at a separate location from the barn area and has been shown here as being separated by a wall 6. The air in the barn may be contaminated and contain dust or other foreign matter while the milk room air is clean and its cleanliness and sanitation regulated by various state laws.

One end of the milk line 1 extends into the milk room 5, and its end 7 is adapted to receive a flexible tube 1a which is often made of plastic. When the milk line 1 is to be cleaned, the end 1b of tube 1a is immersed in a cleaning solution 8 in tank 9.

The other end 1c of the milk line is connected to and in fluid communication with a fluid accumulator 15 by means of the solution inlet 16 located at the lowermost end of the accumulator. A vacuum inlet 17 is provided adjacent the upper side and has an enlarged portion 18 which is generally semi-spherical in shape, in accordance with the present invention, as will appear later. A vacuum line 20 is connected to the accumulator conduit and then extends through wall 6 and into the milk house 5 where it is connected to a fluid trap 22.

Only a single milk line is necessary, that is to say, it is not necessary to have a second milk line return from the sealed accumulator 15, which may be located at the other end of the barn, back to the milk house 5.

The fluid trap has a ball 22a therein which can float on the solution, and in the event the trap becomes full, the ball will seal at the suction opening (as shown by the dotted line in FIGURE 5) and cut off the suction. The trap also has a flapper valve 22b which opens to dump any fluid in the trap when the suction is cut off.

The trap 22 is also in communication via conduit 23 with a slide valve V. The valve V in turn is in communication via conduit 24 with a source of vacuum (not shown).

The valve V is of the slide plate type having a body 25 and slide 26, the slide being actuated by solenoids S1 or S2 to place the line 20 under vacuum or open to atmosphere. In this manner, the accumulator is alternately subjected to a vacuum or open to atmosphere via valve V.

More specifically, the valve body has a right angle passage 30 in communication with line 20 and which can be placed in communication with the vacuum supply conduit 24 via a hole 31 in the slide 26 when the latter has been shifted by solenoid S2 to the position shown in FIGURE 3.

When the valve slide 26 has been shifted by solenoid S1 to the position shown in FIGURE 4, passage 30 and consequently line 20 and accumulator 15 are open to atmosphere via the recess 33 in the slide, as shown. In this position, the vacuum source line 24 is blocked by the valve body.

The electric solenoids are actuated by the electric timer T which may be of the conventional one-minute repeater type which has a series of tabs 40, each representing one second, which tabs can be manually set so as to clear or abut against a micro-switch 41 as the wheel 42 on which they are mounted rotates. This timer includes an electrically driven motor 43 which drives the wheel 42 in the known manner. With the timer set as shown, the tabs are arranged to provide a period of twenty seconds for the suction to be applied directly to the accumulator.

An air injection timer 46 is connected to the line 1 adjacent its end near the solution source so as to permit slugs of air to be drawn in with the solution to facilitate the cleaning action. If a more complete description of this air injection timer 46 is desired, reference may be had to my U.S. Patent No. 3,139,107, issued June 30, 1964, entitled, "Fluid Handling Apparatus for Milk Pipeline Washing System."

The present invention can also be used to thoroughly clean milker lid cleaning assemblies such as are shown and described in detail in my U.S. Patent No. 3,173,434, issued Mar. 16, 1965, entitled "Milker Lids Cleaning Apparatus." The conduits 50 (FIGURE 1) leading from these assemblies 51 can be placed in communication with a manifold 52 which is fixed to the wall 6 in the milk house. This tubular manifold is closed at one end 53, and the end of the plastic tube 1a can be slipped snugly over the other end 54 of the manifold. Downwardly extending nipples 55 provide a convenient means for attaching conduits 50 by slipping the latter thereon. Suitable caps 56 close the unused nipples.

In the cleaning operation, the valves 4 are closed, and the end of tube 1a is inserted in tank 9. The cleaning solution from tank 9, along with air from timer 46, are drawn into line 1, and the accumulator substantially fills with solution. Any excess solution that gets in line 20, usually as vapor, is trapped by the trap 22. The timer T is set for the desired interval to actuate the solenoids alternately and cause the accumulator 15 to be subjected to suction or atmosphere.

In accordance with the present invention, the enlarged, semi-spherical end 18 formed integrally with and adjacent the top of the accumulator, substantially prevents the solution from being drawn into the suction conduit 17 and into line 20 as the accumulator is filling. The semi-spherical recess 18 is located off-center from the extreme top of the accumulator, but adjacent to the extreme top. I have found that such an enlarged, semi-spherical projection 18 breaks up the film of solution that sloshes across that area, which splashing or sloshing is due to the applied suction while the accumulator is filling. By means of this invention, the solution instead of being drawn into line 20, is fragmentized or broken up across the relatively wide area of portion 18 which forms a generally semi-spherical recess on the inside of the upper end of the accumulator, and the suction can be drawn through this area without carrying the solution along with it and into the suction inlet formed by conduit 17. This device functions as an effective air velocity reducer for the vacuum line.

In operation, as the solution and air slugs are pulsated back and forth in the line 1, good scouring action is provided, and after cleaning, the suction is cut off by the valve and timer, and the solution then all drains back to the tank 9.

In order to return the milk line 1 to a milking operation, the end of the line 1 is placed in a vacuum bulk tank (not shown), and the valve V shut off so as to block the source of vacuum from conduit 24. Valves 4 are opened, and the suction in the vacuum tank (not shown) causes the milk from conduits 3 to flow directly to the vacuum tank (not shown).

The present invention provides an easily cleaned, and efficient accumulator which can remain sealed at all times.

Various modes of carrying out the invention are contemplated as being within the scope of the following claims particularly pointing out and distinctly claiming the subject matter which is regarded as the invention:

1. For use in a milk line system, a fluid accumulator comprising a generally spherical and transparent container, a fluid opening in the bottom of said container, a generally semi-spherical enlargement formed adjacent the upper end of said container so as to form a generally semi-spherical recess on the inside of the upper end of said container, and a suction inlet in said recess which is adapted to be connected to a vacuum source for subjecting said container to vacuum.

2. A fluid accumulator for a milk line system, said accumulator comprising a generally spherical and transparent container, a fluid opening in the bottom of said container, and an enlargement in said container and forming a generally semi-spherical recess on the inside of and adjacent the upper end of said container, and a suction inlet in said enlargement and in communication with said recess which inlet is adapted to be connected to a vacuum source for subjecting said container to vacuum.

3. An accumulator as defined in claim 1 further characterized in that said enlargement is located adjacent to but off-center from said upper end of said container.

4. An accumulator as defined in claim 2 further characterized in that said enlargement is located adjacent to but off-center from said upper end of said container.

References Cited

UNITED STATES PATENTS 3,224,413  12/1965  Patterson _____ 119—14.07

SAMUEL KOREN, *Primary Examiner.*

HUGH R. CHAMBLEE, *Examiner.*